No. 669,197. Patented Mar. 5, 1901.
A. W. FELTMANN & H. HARTWIG.
VULCANIZER AND FLASK FOR DENTAL PURPOSES.
(Application filed Apr. 27, 1900.)
(No Model.) 2 Sheets—Sheet 1.
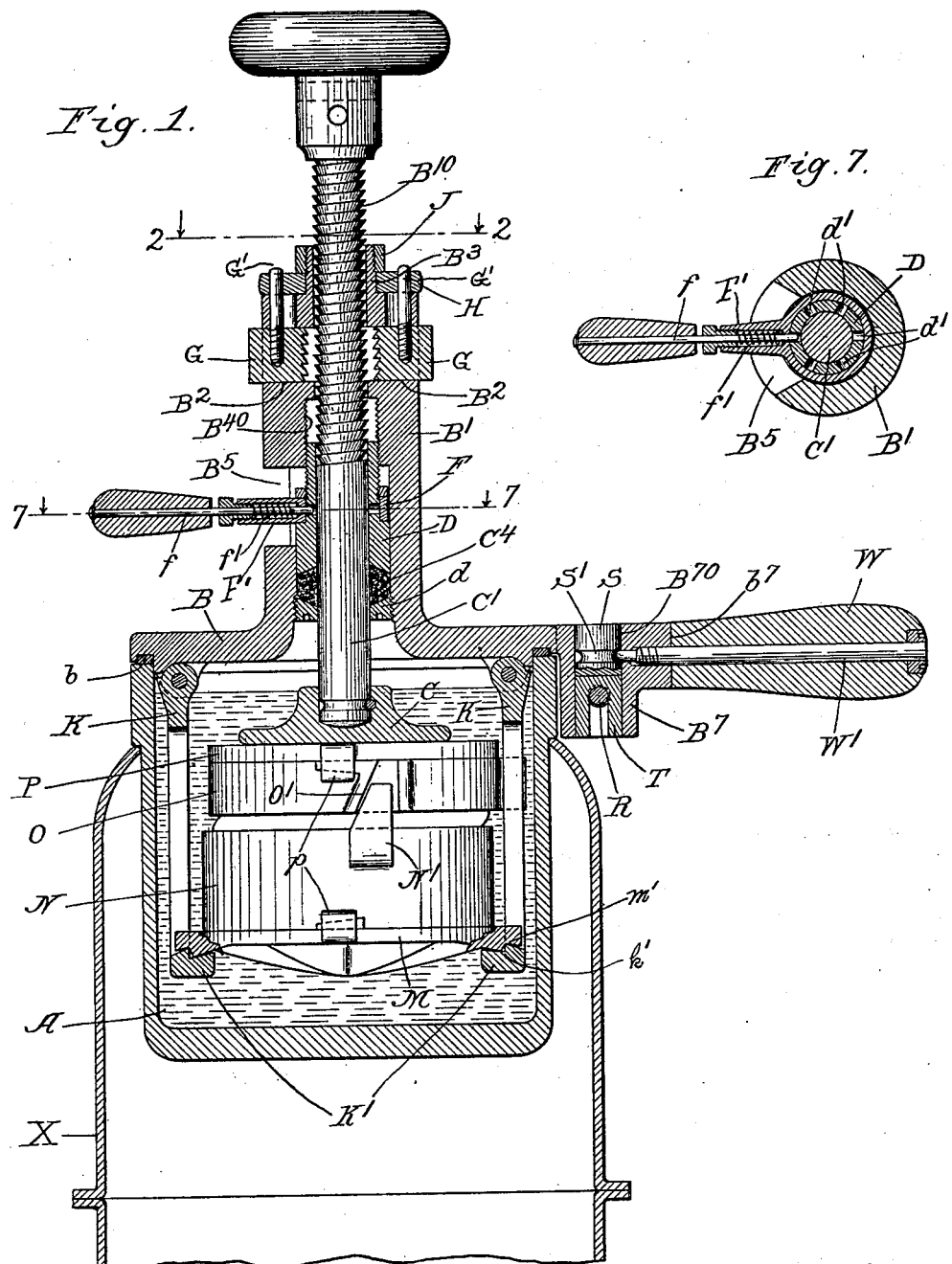
Witnesses.
Edward T. Wray.
Adna H. Bowen Jr.
Inventor's.
Adam W. Feltmann
Henry Hartwig
by Burton and Burton
their Atty's.

No. 669,197. Patented Mar. 5, 1901.
A. W. FELTMANN & H. HARTWIG.
VULCANIZER AND FLASK FOR DENTAL PURPOSES.
(Application filed Apr. 27, 1900.)
(No Model.) 2 Sheets—Sheet 2.
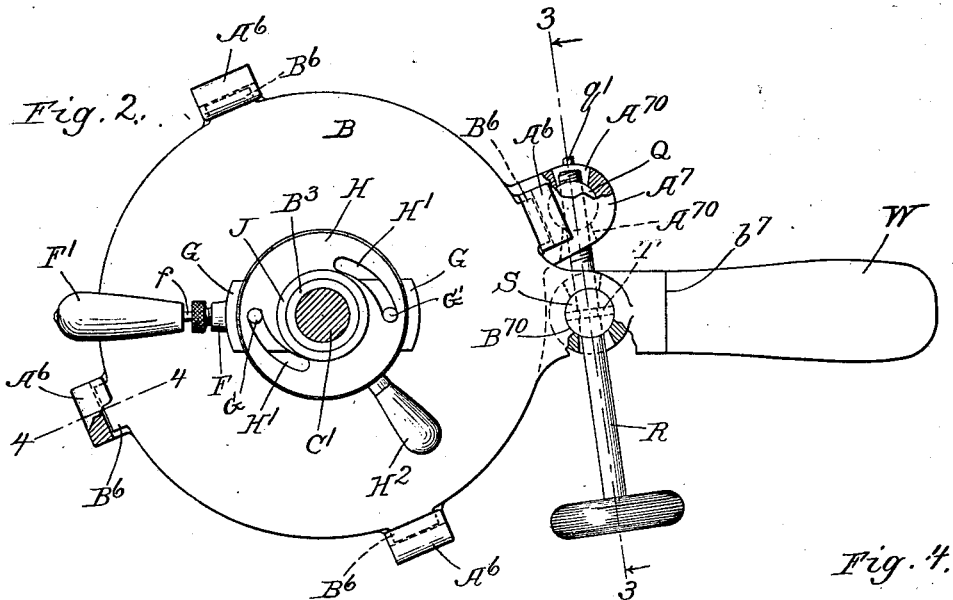
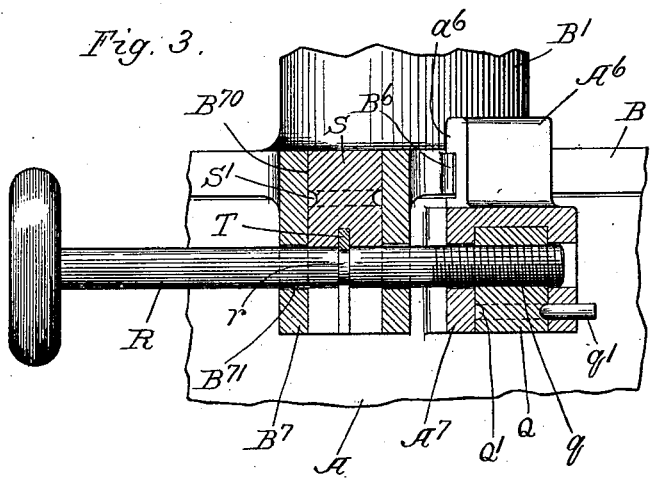
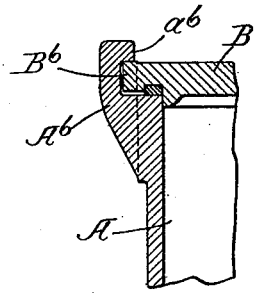
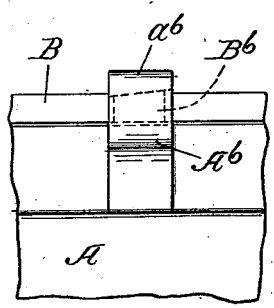
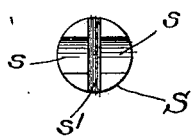
Witnesses.
Edward T. Wray.
Adna H. Bowen Jr.
Inventor's.
Adam W. Feltmann
Henry Hartwig
by Burton Burton
Their Att'ys
THE NORRIS PETERS CO., PHOTO-LITHO., WASHINGTON, D. C.

UNITED STATES PATENT OFFICE.

ADAM WM. FELTMANN AND HENRY HARTWIG, OF CHICAGO, ILLINOIS.

VULCANIZER AND FLASK FOR DENTAL PURPOSES.

SPECIFICATION forming part of Letters Patent No. 669,197, dated March 5, 1901.

Application filed April 27, 1900. Serial No. 14,570. (No model.)

*To all whom it may concern:*

Be it known that we, ADAM WILLIAM FELTMANN and HENRY HARTWIG, citizens of the United States, residing at Chicago, county of Cook, State of Illinois, have invented certain new and useful Improvements in Vulcanizers and Flasks for Dental Purposes, which are fully set forth in the following specification, reference being had to the accompanying drawings, forming a part thereof.

The purpose of this invention is to provide an improved apparatus in the nature of a dental vulcanizer and flask to be used with pressure and constituting to some extent, therefore, a press for forming and vulcanizing celluloid and rubber plates, and other like purposes chiefly for dental work.

In the drawings, Figure 1 is a vertical axial section of our improved apparatus. Fig. 2 is a section at the line 2 2 on Fig. 1, giving substantially a top plan view of the pot. Fig. 3 is a detail section at the line 3 3 on Fig. 2. Fig. 4 is a detail section at the line 4 4 on Fig. 2. Fig. 5 is a detail side elevation of the engagements of pot and cover. Fig. 6 is an end view of the swivel-post of the clamping-screw. Fig. 7 is a section at the line 7 7 on Fig. 1.

A is the pot, which is suspended over the heater, which may be represented by the pot-support X.

B is the pot-cover, which makes a tight seat upon the top of the pot, as represented at $b$.

B' is a hub or turret extending upward from the center of the cover and affording guide-bearings for the stem C' of the follower C and supporting and containing the means by which the follower is advanced down into the pot and retracted at will. The hub B' has an axial bore of suitable size to admit the stem C' and to seat it. The stem is threaded at a portion $B^{10}$ toward the upper part and adapted to engage a divided nut G G, which is seated in the transverse aperture $B^2$, which extends through the hub or turret B' near the upper part, the two parts of the nut having each a pin G' G', extending through radial slots in the hub above the aperture $B^2$ and engaging in the oblique or eccentric slots H' H' of the cam-plate H, which is journaled on the reduced upper end portion of the hub at $B^3$ and has a suitable handle $H^2$, by which it may be oscillated about its said bearing.

J is a collar or nut screwed on the upper end of the reduced portion $B^3$ to retain the plate H.

The purpose of providing a divided nut as the means of engaging the stem C' of the follower is to permit the stem to be released, so that the follower may be actuated vertically by hand and the condition of the material in the flask tested preparatory to applying pressure by means of the screw. This feature is fully explained and claimed in our application, Serial No. 735,852, filed November 4, 1899.

The hub or turret B' has the aperture through which the stem C' passes enlarged at the lower part, forming a chamber $C^4$ around the stem. A collar $d$, screwed into the lower end of this enlarged chamber, closes up the annular space thereof around the stem at the lower end; but before this collar $d$ is used there is introduced into said chamber the compressor-sleeve D, which is designed to compress packing in the chamber which is formed for that purpose. Since this compressor-sleeve must be introduced from the lower end, and since in order to introduce the packing below it it must be so arranged that it can be advanced upward to a point above some opening which may be provided for the introduction of packing, we consider it preferable to provide at the upper end of the compressor-sleeve the threaded engagements between said sleeve and the hub by which the former is adapted to be forced downward to compress the packing, and for this purpose the upper end portion of said sleeve may be reduced in diameter, the upper end portion of the annular chamber around the stem C' being similarly reduced and being interiorly threaded at $B^{40}$.

$B^5$ is a lateral aperture in the hub B', which is provided for the purpose of giving access to the compressor-sleeve and also for inserting packing into the stuffing-box, and for the latter purpose it is of sufficient extent up and down to permit the follower to be screwed up until its lower end is some distance above the lower margin of said aperture. The reduced and threaded portion $B^{40}$ of the chamber provided for the compressor-sleeve is of course of sufficient extent also to permit such an amount of vertical adjustment of said compressor-sleeve. For convenience in adjusting the compressor-sleeve D and setting it downward to compress the packing we make below the threaded portion of said compressor-sleeve a series of sockets $d'$ $d'$, all at the same level and at intervals of thirty degrees, more or less, around the follower, and at that portion of the compressor-sleeve we journal upon it a collar F, which has a stem or handle F', extending out through the aperture $B^5$, and in said stem a plunger $f$, which is arranged at its inner end to engage the apertures $d'$, a spring $f'$ being provided to actuate the plunger into engagement with the recesses $d'$, and said plunger having its outer end extended, so that it can be taken hold of to disengage it from said recesses. The circumferential extent of the aperture $B^5$ being greater than the angular distance between the consecutive recesses $d'$, the operator can use the collar F and its handle as a wrench to rotate the compressor-sleeve, screwing it into and out of the stuffing-box.

K K are the hangers, pivoted to the under side of the cover at opposite sides of the follower C and free to oscillate through at least a small angle and provided at their lower ends with hooks K' K', by which they may engage the corresponding features upon the under side of the bottom plate M of the flask. The remainder of the flask consists of the members N and O and the top cap P. Either of the members N or O may be the upper and the other the lower, the provision for engaging them with the top and bottom plate being identical in form, consisting of lugs projecting outward from the opposite sides of said members N O and undercut lugs $p$ $p$, projecting from the face of the top and bottom plates, a slight bevel or slope of the coöperating faces of said lugs serving to cause the plates to be drawn tightly to place as the engagement is effected. In making dental plates it is in almost every instance necessary in order to obtain a proper fit that there should be a slight undercut at the forward side—that is, at the side corresponding to the front of the jaw. In order that this undercut may be properly produced in molding plates and vulcanizing same, it is necessary to permit the two parts of the flask, containing, respectively, the two members of the mold between which the plate is to be formed, to approach with a slightly-oblique movement, so as to thrust one member of the mold under the overhanging portion of the opposite member at the part where such undercut is to be produced in the plate. In addition to this it desirable that there should be some opportunity for some lateral accommodation of the two members of the mold to each other, even where there is no decided undercut, in order that the plate which is being formed between them shall not be liable to be sheared off at any point when the clearance between the opposed walls of the mold as they enter by or within the other is limited very closely. It is for this purpose that we provide the flexibly-suspended support for the flask, consisting of the hangers K K, pivotally and not rigidly attached to the cover, and having the bottom plate pivotally supported in the hooks K' at the lower ends of said hangers, the latter pivotal connection being produced by giving one of the parts, as the hook V, shaped projections $k'$, which are received in V-shaped recesses $m'$ on the bottom plate of larger angle than the said projection $k'$, thus affording an approximately knife-edge bearing with a range of movement due to the excess of angle of the recesses over that of the projections. Upon the two members N and O of the flask, which contain, respectively, the two parts of the mold between which the plates are formed, we provide coöperating engagements N' O' of a cam-like nature, which come into somewhat loose and free engagement when the members of the mold are first brought toward each other, the engagement becoming closer as they approach nearer and the plate is more nearly shaped to its final form, the engagement at the finish of the movement being practically without play, so that the two parts of the mold are brought home to each other accurately, and thus accurately complete the formation of the plate between them by positively thrusting the forward side of one member of the mold under the overhang of the corresponding member at the point where the undercut formation exists. It will be seen that in order to effect this result accurately the direction in which the bottom plate, which supports the lower member of the flask, is permitted to swing by the pivoted hangers K K is that in which such movement is forced by the slope of the cam engagements N' O'. It will be understood that the necessity for the flexible suspension of the lower member of the flask, in order to yield the result described, arises from the fact that when the pressure is being applied to force the two members of the flask and mold together the friction between the upper plate of the flask and the lower face of the follower C prevents lateral sliding of the upper member of the flask, so that the accommodation must be obtained by a corresponding movement of the lower member.

In order to bind the cap or cover B firmly upon the top of the pot A and also to provide means for conveniently handling the apparatus and quickly releasing the engagement between the cover and pot, we provide the cover with any convenient number, as three or more, of peripheral projections or lugs $B^6$ $B^6$, and on the pot we form a corresponding number of hooked lugs $A^6$ $A^6$, whose hooks $a^6$ $a^6$ overhang the path of the lugs $B^6$, so that, the cover being placed upon the pot with the lugs $B^6$ near the lugs $A^6$, respectively, and rotated, said lugs $B^6$ will pass under the hooks $a^6$ of the lugs $A^6$, and the cover be thus engaged with the pot. The upper surface of the lugs $B^6$ and the lower surface of the hooks $a^6$ are correspondingly sloped, so that the rotation described, which effects the engagement, tends also to effect a clamping of the cover down onto the pot. In order to produce this relative rotation with the necessary force to effect also secure clamping by the means described, we provide at any convenient point in the circumference of the pot and cover an outwardly-projecting boss upon each. $A^7$ represents this boss upon the pot, and $B^7$ the coöperating boss on the cover. The cover-boss is in the form of a hook—that is, it projects outward and downward in angular form, so that its downwardly-projecting portion stands in the same horizontal plane or path of rotation with the directly outwardly projecting lug $A^7$ of the pot. In one of these bosses we swivel a nut and in the other a bearing-piece for a bolt which may engage the nut, the bearing-piece being arranged to stop the bolt endwise, while permitting it to rotate freely. As illustrated and as most convenient, we place the swiveled nut Q in the lug $A^7$ of the pot, said lug having a vertical cylindrical socket to receive the swiveled nut, which is cylindrical about a vertical axis and is tapped for the bolt at $q$ at right angles to that axis. The swiveled nut may be retained in the socket by a pin $q'$, set through the boss and engaging an annular groove $Q'$ around the swiveled nut near the lower end. The boss $A^7$ has the tapering or conical apertures $A^{70}$ $A^{70}$, extending horizontally, the axes of said apertures intersecting the axis of the cylindrical aperture in which the nut Q is seated, so that when the bolt R is screwed through the nut it may have a short range of horizontal oscillation about the axis of the nut, the tapering apertures $A^{70}$ accommodating such movement where the bolt extends through the boss. For the swivel-bearing of the bolt in the boss $B^7$ we provide said boss with a cylindrical vertical aperture at $B^{70}$ and at right angles thereto a cylindrical aperture $B^{71}$, whose axis intersects the axis of the first aperture and whose diameter is such as to accommodate the clamp screw or bolt R. Through the vertical cylindrical aperture $B^{70}$ we insert a swivel-bolt S, such bolt being inserted from above downward and being at the lower end bifurcated or provided with a deep notch $s$, wide enough to permit the swivel-bolt to stride the bolt R when it is inserted down through the boss, as described. Said swivel-bolt has also a bifurcation or deep notch $s'$, extending from the lower end upward at right angles to the notch $s$, causing the bolt to be bifurcated at right angles to the first bifurcation, and the bolt R has an annular groove at $r$, at which a notched or forked stop-plate T strides said bolt R. This plate T is introduced into the position indicated, striding said bolt R at the annular groove $r$ after said bolt is inserted through the horizontal aperture $B^{71}$ and before the swivel-bolt S is inserted, and said swivel-bolt being inserted as described strides both the bolt R and the plate T. The plate T now stops the bolt R against longitudinal movement and is in turn stopped by the engagement of the swiveled bolt; but said plate having a length transverse to the notch by which it strides the bolt R equal only to the diameter of the swivel-bolt S does not interfere with the rotation or oscillation of the swivel-bolt in its seat, and thus the bolt R is longitudinally stopped and swiveled in the lug or boss $B^7$. Said boss $B^7$ is arranged at the outer end to afford a seat $b^7$ for a wooden handle W, and the center bolt or rod W', which secures the wooden handle to the flat end $b^7$ of the boss, is arranged to be set through the boss into the cylindrical seat of the swivel-bolt S and intrudes into an annular groove S', which encompasses said bolt near the upper end, and thus retains said swivel-bolt against longitudinal displacement from its seat. It will be understood that when the cover is to be removed the clamp screw or bolt R is rotated until it becomes entirely disengaged from the nut Q, so that said clamp screw or bolt remains with the cover when it is removed.

We claim—

1. In an apparatus for the purpose stated, the pot and cover having engagements adapted to become interlocked by relative rotation of said two parts, each having an approximately radial projection, such projections standing one in the path of rotation of the other, and a screw-shaft which engages such projections, having its axis in a plane parallel to the plane of seating of the cover on the pot.

2. In an apparatus for the purpose stated, a pot and cover, having engagements adapted to become interlocked by relative rotation of said two parts; a tangent screw-shaft; a swiveled bearing for said shaft on one of said parts; and a swiveled nut for the same on the other part.

3. In an apparatus for the purpose stated, a pot and cover having respectively marginal abutments, coöperating in couples, one on each part, at least one member of each couple having its coöperating face inclined to the plane of seating of the cover on the pot; a tangent screw-shaft; swivel-bearings for the shaft on one of the two parts, and a swiveled nut for the same on the other part.

4. In an apparatus for the purpose stated, in combination with the pot the cover having the extended hub or turret, a follower having its stem extended through such hub, said hub having a stuffing-box chamber around the stem at the lower part, and a lateral aperture above the stuffing-box; and an interiorly-threaded part above the aperture; a compressor-sleeve for the stuffing-box, having its upper end screwed into the threaded part of said chamber, and accessible through such lateral aperture.

5. In an apparatus for the purpose stated, in combination with the pot, the cover, having an extended hub or turret; a follower, having its stem extended through such hub, the hub having a chamber around the stem extending from the lower end thereof upward, such chamber being reduced in diameter and interiorly threaded at the upper end; a compressor-sleeve in such chamber threaded at the upper end to engage the thread on the chamber; and a stop-ring screwed into the lower end of the chamber, below the sleeve, such chamber having a lateral aperture for access to the sleeve.

6. In an apparatus for the purpose stated, in combination with the pot, the cover, having a hub or turret, the follower, having a stem extended through such hub; the hub having a stuffing-box chambered around the stem at the lower part; a lateral aperture above the stuffing-box, and a reduced and interiorly-threaded part above the aperture; a compressor-sleeve for the stuffing-box, whose upper end is screw-threaded to engage said interiorly-threaded upper portion of the chamber; the collar, on the stuffing-box sleeve, having a stem or handle extending out through the aperture; and a spring-actuated plunger in such stem and protruding therefrom, the follower-stem having sockets for engagement of said plunger.

7. An apparatus for the purpose stated, comprising a pot and cover for the same, a flask-support flexibly suspended from the cover into the pot, whereby the member of the flask which is immediately supported by such suspended support may have lateral movement while under vertical pressure.

8. An apparatus for the purpose stated, comprising a pot and a cover for the same; a flask-support consisting of hangers hinged to the under side of the cover at substantially parallel lines on opposite sides of the follower, and arranged at their lower ends to engage and carry the flask, whereby said member may have lateral movement while under vertical pressure, and the direction of such movement is determined by the direction of the hinged surface.

9. In an apparatus for the purpose stated, the pot and cover for the same; the follower, and means for advancing it down into the pot; a flask having upper and lower members, provided with engagements tending to cause them to approach each other obliquely; and the flask-support, flexibly suspended from the cover into the pot, whereby the lower member of the flask may have lateral movement while under vertical pressure to accommodate the tendency to oblique approach of the flask members.

10. In combination with the pot, cover, and flexibly-suspended hangers, the bottom plates of the flask and said hangers having, on one part, V-shaped recesses, and on the other V-shaped projections, of less angle than the recesses, and in position to seat in the latter.

In testimony whereof we have hereunto set our hands, at Chicago, Illinois, in the presence of two witnesses, this 21st day of April, A. D. 1900.

Á. WM. FELTMANN.
HY. HARTWIG.

In presence of—
  CHAS. S. BURTON,
  ADNA H. BOWEN, Jr.